Dec. 13, 1938.   H. G. CUNNINGHAM   2,140,260
CAMERA ADJUSTING MECHANISM
Filed March 31, 1936   3 Sheets-Sheet 1
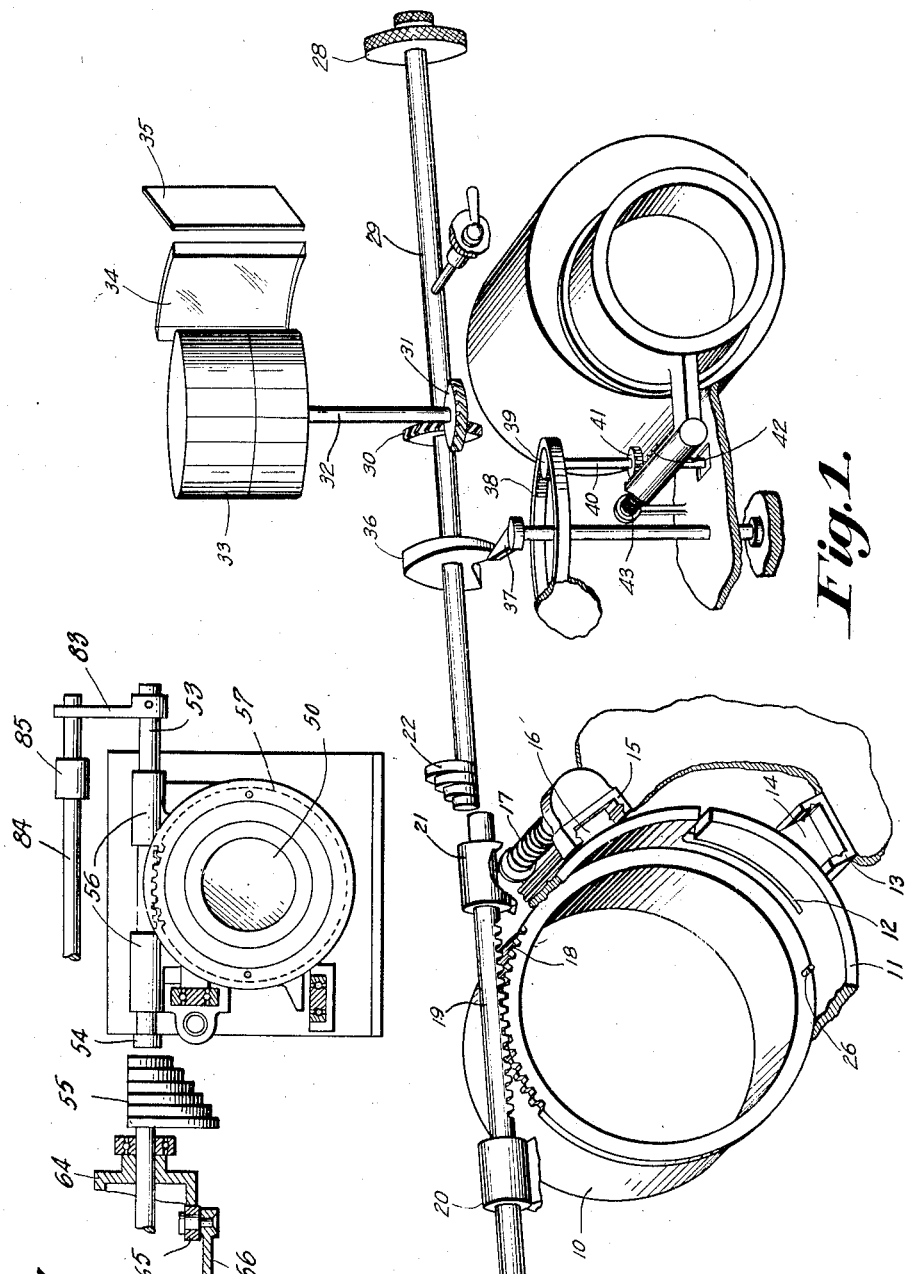
INVENTORS
HARRY G. CUNNINGHAM
BY
ATTORNEY

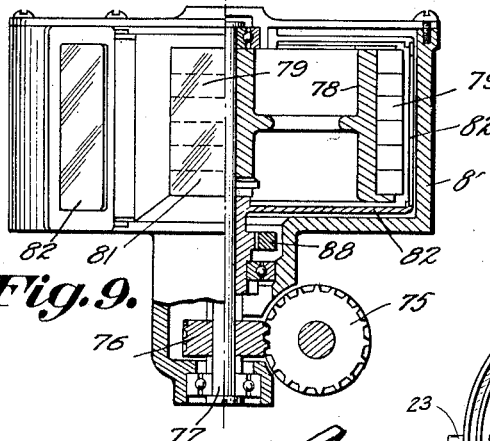
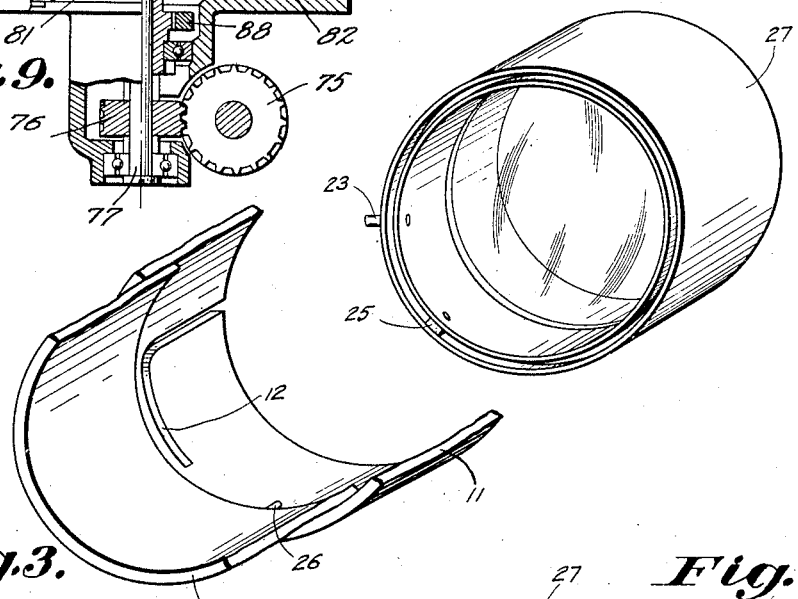
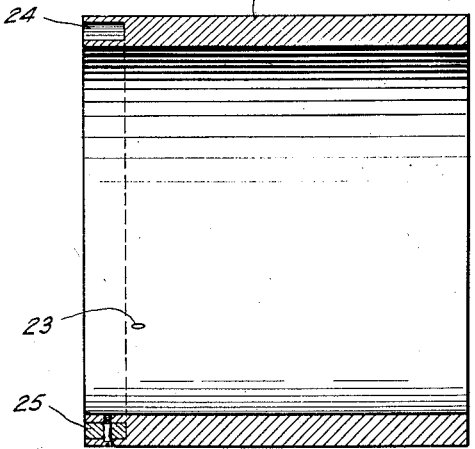

INVENTORS
HARRY G. CUNNINGHAM
BY
ATTORNE

Patented Dec. 13, 1938

2,140,260

UNITED STATES PATENT OFFICE 2,140,260

CAMERA ADJUSTING MECHANISM

Harry G. Cunningham, Los Angeles, Calif., assignor to R. K. O. Studios, Inc., a corporation of Delaware Application March 31, 1936, Serial No. 71,823

6 Claims. (Cl. 95—45)

The present invention relates to adjusting mechanism particularly adapted for use with motion picture cameras and includes mechanism for adjusting the focus of the lens and of the finder and for correcting for the parallax of the finder in accordance with the focal adjustment. The mechanism is of such a nature that, although it can be used directly on an unenclosed camera, it is equally useful and of particular value when the entire camera is enclosed in a soundproof housing, such as is commonly referred to as a camera blimp.

The device includes mechanism for focussing the lens of the camera accurately by means of a scale which is automatically adapted to any one of a set of interchangeable lenses. The focussing mechanism accurately focusses any one of the lenses, selects the corresponding scale, simultaneously focusses the finder, and directs it to intercept the axis of the lens at the point of focus.

One object of the invention is to provide a means for accurately adjusting the lens of a camera to correspond with the focussing scale irrespective of the focus of the lens. Other objects of the invention are to provide the means for focussing the finder of the camera simultaneously with the focussing of the camera lens and independently of the relation of the focal length of the finder lens and the camera lens, to provide means for focussing a camera enclosed within a soundproofing device, to provide means for correcting for the parallax between the finder and the camera simultaneously with focussing the finder, to provide means for preventing the insertion of the lens into the camera unless the focussing device is set at infinity, and to provide means for adjusting the focussing device to correspond with a focal length of a lens inserted into the camera.

Other incidental objects of the invention will be apparent from a reading of the following specification and an inspection of the accompanying drawings, in which:—

Figure 1 is a perspective view of the mechanism of one form of my invention.

Fig. 2 shows a lens mount constructed in accordance therewith.

Fig. 3 shows the lens holder and adjusting ring forming a part of my device.

Fig. 4 is a sectional view of the lens mount shown in Fig. 2.

Fig. 7 is an end view of the lens showing the front plate and attendant mechanism of the apparatus of Fig. 5.

Fig. 9 is a view partly in section of a modified type of indicator dial and

Fig. 10 is a detail of the shutter used with the dial of Fig. 9.

Figure 5:
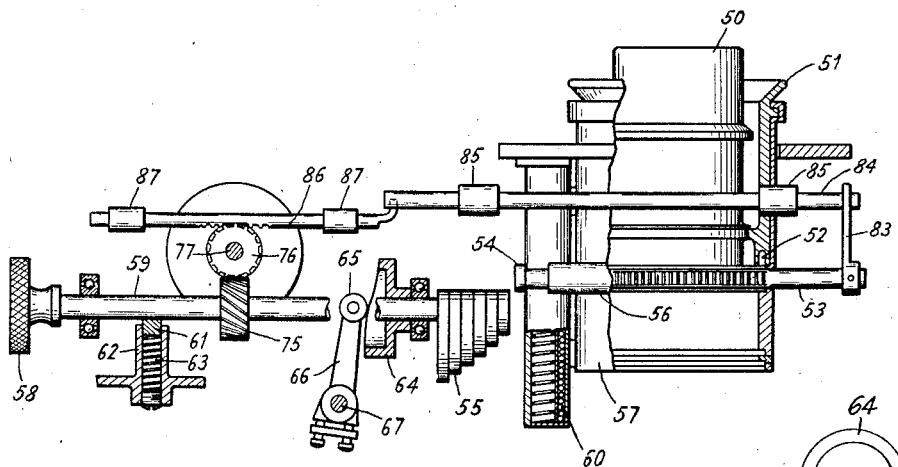
Fig. 5 is a plan view of the mechanism of a slightly modified form of the invention.

Referring first to the form of the invention shown in Fig. 1, a rotatable and axially movable lens barrel 10 is provided within which the lens mount is retained by the bayonet slot 12 in the sleeve 11. The barrel 10 and sleeve 11 are movable as a unit along the linear V-shaped fall races of ways 13 and 15 and guide members 14 and 16. The lens also is urged to innermost position, i. e., the infinity position, by means of the coil spring 17. In engagement with the gear teeth 18 on the barrel 10, there is provided a rack 19 which slides through the guides 20 and 21. One end of this rack is adapted to engage the multiple cam 22. It will be noted that the lens barrel 10 is rotatable in the sleeve 11 and the members 20 and 21 are made integral with the sleeve 11 so that when the rack 19 is moved by the cam 22, the members 20 and 21 cause the entire assembly to move as a unit in the ways 13 and 15.

Referring now to Figs. 2, 3 and 4, the lens mount is provided with a pin 23 which is adapted to engage the bayonet slot 12. The rear end of the lens mount has an annular slot 24 (Fig. 4) into which is fitted a block 25. This block 25 is adapted to cooperate with the pin 26 in the barrel 10 which fits into the groove 24 when the lens mount is slipped into the sleeve 11 and the pin 23 into the slot 12.

It will be apparent from Fig. 1 that when the lens mount 27 is slid into the sleeve 11, the pin 26 will enter the slot 24 at a position ahead of the block 25 in its direction of rotation. When the lens is then rotated clockwise until the pin 23 reaches the end of the slot 12, the block 25 will engage the pin 26 and cause it to move, also clockwise, by an amount determined by the relative positions of the pin 23 and the block 25. These relative positions are chosen according to the focal length of the lens and are such that rotation of the barrel 10 will cause the rack bar 19 to move into engagement with the proper cam element of the multiple cam 22. It will thus be apparent that rotation of the focussing knob 28 on the shaft 29 will rotate the cams 22 and move the lens barrel 10 and sleeve 11 forward by an amount determined in correspondence with the focal length of the particular lens selected.

The shaft 29 carries a gear 30 engaging a gear 31 on the shaft 32 which carries the drum scale 33. It will be apparent that, due to the use of the multiple cam 22, the scale graduations of the drum 33 for lenses of different focal length can be quite similar, if not identical.

The apparatus, as shown in Fig. 1, is viewed from the front of the camera and the cameraman in normal operation of the camera ordinarily stands to the rear of it. There is, accordingly, provided a window 34 which is preferably a magnifying lens in the casing housing the mechanism and a mirror 35 reflects the indicia of the scale 33 to the field of view of the operator. It may be convenient to illuminate the drum dial 33 either by a lamp therewithin if it is made of transparent material, or a lamp within the housing of the apparatus, if the drum is made of opaque material.

The shaft 29 also carries the cam 36 which serves to focus the view finder. This cam cooperates with the arm 37 which in turn is connected to the internal gear 38. The gear 38 drives the gear 39 on the shaft 40 and thereby actuates the gear 41 which moves the rack 42 back and forth. The rack 42 is made hollow, as shown, and contains the spring 43 which acts in opposition to the cam 36 and thereby takes up lost motion in the parts and returns the finder to its intial position on retraction of the cam. As shown, the rack 42 is connected to the objective lens of the finder.

Referring now to the form of the invention shown in Figs. 5 to 9: the lens 50 is fitted into an adapter 51 which is provided with a slot 52 at the rear thereof having a block therein which actuates the rack rod 53. This rod carries at its outer end a thrust member 54 adapted to bear against the multiple cam 55 and the rod 53 slides in a tubular guide 56 which is rigidly attached to the lens barrel 57. The multiple cam 55 is connected to the focussing knob 58 by the shaft 59. It will be apparent that the insertion of the lens 50 and adapter 51 into the mechanism shifts the rod 53 until the thrust member 54 is in cooperative relation to the proper section of the multiple cam 55 and that rotation of the knob 58 will thereupon shift the entire lens mount assembly forward from the "infinity" position to appropriate focal position against the action of the spring 60. The shaft 59 which is mounted on ball bearings is provided with a stationary friction member 61 adapted to bear thereagainst and movable in a tubular recess in the member 62 against the thrust of the spring 63 which maintains the friction uniform and thereby retains the lens in focussed position. The cam 64 which is fixed to the shaft 59 cooperates with the roller 65 on the arm 66 and serves to rotate the shaft 67 in correspondence with the movement of the focussing knob 58. This shaft 67 is connected, as diagrammatically indicated, to a pinion 68 (Fig. 6) which is moved in accordance with the movements of the shaft. This pinion 68 operates against a fixed rack sector 69 and also cooperates with the movable rack 70. It will be apparent that when the pinion 68 is moved in one direction or the other it will cause the rack 70 to move back and forth and thereby serves to focus the finder 71 by movement of the eyepiece 72 thereof. The finder 71 is pivoted at an appropriate point in its length and connected to a spring (not shown) which urges the rack 70 against the pinion 68. It will be apparent that when the pinion 68 travels along the sector 69 it will cause the rack 70 and, therefore, the eyepiece 72 and the finder 71 to move about the pivot of the finder by an amount determined by the curvature of the rack, thereby correcting for errors of parallax between the axis of the camera and the axis of the finder.

In Fig. 5 the shaft 59 is provided with a helical gear 75 which engages a second gear 76 affixed to the shaft 77. Referring now to Fig. 9, this shaft 77 is mounted on appropriate ball bearings and carries at its upper end a drum member 78 having thereon a dial or series of indicating dials 79. This drum is rotatable within the housing 80 and the indicia on the drum dials are viewable through a window 81 in this housing either directly or by reflection in the mirror 82 which permits an operator at the rear of the camera to view the dials adjacent to the front thereof.

It will be noticed that the number of rows of indicia indicated on the dial 79 corresponds with the number of elements in the cam 55 (Figs. 5 and 7). Within the housing 80 and outside of the drum 78 there is located a shutter unit 82 shown in more detail in Fig. 10. This shutter unit is provided with apertures spaced axially to correspond with the scales 79 and also spaced circumferentially on the shutter at distances corresponding to the spacing of the elements of the cam 55. The rod 53 (Fig. 5) is connected by an arm 83 to a longitudinally slidable rod 84 movable in guides 85 which do not slide axially with the lens mount. It will be noted that the arm 83 operates in a notch in the rod 84 so that the rack rod 53 and arm 83 can move together along the axis of the lens relatively to the rod 84. This rod 84 is connected to a second rack rod 86 slidable in guides 87 and engages the gear 88 (Fig. 10) on the shutter 82 which turns freely on the shaft 77 (Fig. 9). It will be apparent from the foregoing that when the rod 53 and its thrust member 54 are shifted to engage a particular one of the elements of the cam 55, the rods 84 and 86 will be shifted longitudinally the same amount thereby rotating the gear 88 and the shutter 82 until the appropriate aperture of the shutter 82 is presented before the window 81, thereby rendering visible to the operator the particular one of the scales 79 which is appropriate for the particular element of the cam 55.

Fig. 7 is an end view of the mechanism of Fig. 5 looking from the rear of the lens and showing in somewhat more detail the relation of the rod 53 and the cam 55.

Figure 8:
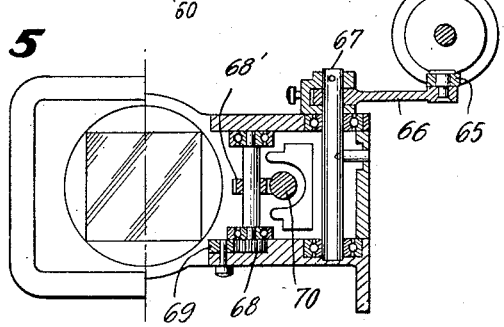
Fig. 8 is a transverse section of the mechanism of the finder shown in Fig. 6.
Figure 6:
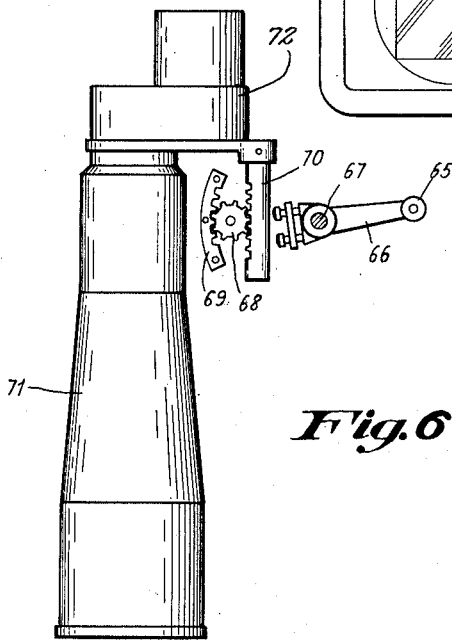
Fig. 6 shows the finder adjusting mechanism used in the arrangement of Fig. 5.

Fig. 8 is a sectional view of the finder of Fig. 6 showing in more detail the connections from the cam 64 to the sector 69. It will be apparent from this figure that instead of using a single pinion 68, as described heretofore, it may be more satisfactory to use two pinions 68 and 68' separately engaging the sector rack 69 and the focussing rack 70.

Having now described my invention, I claim:

1. In apparatus of the class described, the combination of a lens and a mount therefor, a sleeve adapted to receive said lens mount, a movable member associated with said lens mount and arranged for movement in two different directions, a plurality of movable focusing cams, said lens mount and said movable member being so constructed and arranged that, upon insertion of said lens mount in said sleeve, said lens mount engages and moves said movable member in one of said directions a predetermined distance into cooperative association with one of said cams, and means whereby said cams may be moved to effect engagement of said last-named cam with said movable member whereby to move said member in the other of said directions to focus said lens, said movable member comprising a lens barrel and an element movable by said barrel for selecting one of said cams upon rotation of said barrel, characterized further in that said sleeve is mounted for movement along its axis, and characterized still further in that said element and said cams are so related as to effect movement of said lens mount, said sleeve and said lens barrel bodily as a unit along said axis whereby to focus said lens upon movement of said cam.

2. In apparatus of the class described, the combination of a lens and a mount therefor, a sleeve adapted to receive said lens mount, a movable member associated with said lens mount and arranged for movement in two different directions, a plurality of movable focusing cams, said lens mount and said movable member being so constructed and arranged that, upon insertion of said lens mount in said sleeve, said lens mount engages and moves said movable member in one of said directions a predetermined distance into cooperative association with one of said cams, and means whereby said cams may be moved to effect engagement of said last-named cam with said movable member whereby to move said member in the other of said directions to focus said lens, said movable member comprising a lens barrel rotatably carried by said sleeve and an element movable by said barrel into cooperative relation with said cams upon rotation of said barrel, and characterized further in that said barrel and said lens mount are provided with mutually cooperative parts engageable with each other upon adjustment of said lens mount in said sleeve to effect rotation of said lens barrel a predetermined extent whereby to move said movable element into cooperative relation with said one cam.

3. In apparatus of the class described, the combination of a lens and a mount therefor, a sleeve adapted to receive said lens mount, a movable member associated with said lens mount and arranged for movement in two different directions, a plurality of movable focusing cams, said lens mount and said movable member being so constructed and arranged that, upon insertion of said lens mount in said sleeve, said lens mount engages and moves said movable member in one of said directions a predetermined distance into cooperative association with one of said cams, and means whereby said cams may be moved to effect engagement of said last-named cam with said movable member whereby to move said member in the other of said directions to focus said lens, said movable member comprising a lens barrel rotatably carried by said sleeve and an element movable by said barrel into cooperative relation with said cams upon rotation of said barrel, characterized further in that said barrel and said lens mount are provided with mutually cooperative parts engageable with each other upon adjustment of said lens mount in said sleeve to effect rotation of said lens barrel a predetermined extent whereby to move said movable element into cooperative relation with said one cam, characterized further in that said sleeve is mounted for movement along its axis, and characterized still further in that said element and said cams are so related as to effect movement of said lens mount, said sleeve and said barrel bodily as a unit along said axis whereby to focus said lens upon movement of said cam.

4. A picture camera comprising a plurality of similar lens mounts, each mount having a lens of a different type therein, means adapted to support any one of said lens mounts in position in said camera for photographing objects, a rotatable member within said last-mentioned means, a reciprocating member connected to said rotatable member, a plurality of cams corresponding in number to said lens mounts for contacting said reciprocating member, each of said cams being adapted to move a particular lens mount axially, contacting means on said rotatable member, and means on each of said lens mounts for contacting said contacting means on said rotatable member upon rotation of said mounts, each of said last-mentioned means on each of said lens mounts being different from the other to rotate said rotatable member a predetermined different amount for moving said reciprocating member a corresponding amount for selecting a particular cam.

5. A picture camera in accordance with claim 4 in which are provided means for rotating said cams, a viewfinder, and means contacting said cam rotating means for operating said viewfinder simultaneously with the rotation of said cams, the movement of said viewfinder being correlated with the movement of said lens mounts in accordance with the cam selected by the predetermined rotation of said lens mount within said rotatable member.

6. A picture camera in accordance with claim 4 which further comprises a scale for indicating the axial position of said lens mount within said supporting means, said scale being movable by said cam rotating means, said scale being correlated with the axial movement of said lens in accordance with the cam selected by the predetermined rotation of said lens mount within said rotatable member.

HARRY G. CUNNINGHAM.